United States Patent
Oya

(10) Patent No.: US 9,150,249 B2
(45) Date of Patent: Oct. 6, 2015

(54) STEERING ASSIST DEVICE

(71) Applicant: JTEKT CORPORATION, Osaka-shi, Osaka (JP)

(72) Inventor: Toshiaki Oya, Sakai (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/612,859

(22) Filed: Feb. 3, 2015

(65) Prior Publication Data

US 2015/0225018 A1  Aug. 13, 2015

(30) Foreign Application Priority Data

Feb. 12, 2014  (JP) ................................. 2014-024452

(51) Int. Cl.
| | | |
|---|---|---|
| *A01B 69/00* | (2006.01) | |
| *B62D 15/02* | (2006.01) | |
| *B62D 5/04* | (2006.01) | |
| *B62D 6/00* | (2006.01) | |

(52) U.S. Cl.
CPC ............ *B62D 15/025* (2013.01); *B62D 5/0463* (2013.01); *B62D 6/003* (2013.01)

(58) Field of Classification Search
None
See application file for complete search history.

(56) References Cited

U.S. PATENT DOCUMENTS

| | | | |
|---|---|---|---|
| 2005/0027426 A1* | 2/2005 | Kato et al. ...................... | 701/70 |
| 2011/0015850 A1 | 1/2011 | Tange et al. | |
| 2012/0016646 A1* | 1/2012 | Takenaka ......................... | 703/2 |

FOREIGN PATENT DOCUMENTS

| | | |
|---|---|---|
| JP | H11-34774 A | 2/1999 |
| JP | 4292562 B2 | 7/2009 |
| JP | 2013-212839 A | 10/2013 |

* cited by examiner

*Primary Examiner* — Adam Alharbi
(74) *Attorney, Agent, or Firm* — Oliff PLC

(57) ABSTRACT

There is provided a steering assist device that allows a vehicle to avoid departing from a lane. A basic target current value setting unit sets a basic target current value on the basis of steering torque and a vehicle speed. A current compensation value computation unit computes a current compensation value for compensating the basic target current value on the basis of a lateral deviation and a lateral deviation variation rate such that the lateral deviation and the lateral deviation variation rate get close to zero. A target current value computation unit computes a target current value by subtracting the current compensation value computed by the current compensation value computation unit from the basic target current value set by the basic target current value setting unit.

9 Claims, 7 Drawing Sheets

STEERING ASSIST DEVICE

INCORPORATION BY REFERENCE

The disclosure of Japanese Patent Application No. 2014-024452 filed on Feb. 12, 2014 including the specification, drawings and abstract, is incorporated herein by reference in its entirety.

BACKGROUND OF THE INVENTION

1. Field of the Invention

The present invention relates to a steering assist device for a vehicle, and in particular to a steering assist device that prevents a traveling vehicle from departing from a lane.

2. Description of Related Art

If a vehicle, traveling on a highway or the like, departs from a travel lane because of carelessness of a driver or the road surface condition, the vehicle may contact another vehicle or a guard rail. Thus, as described in Japanese Patent Application Publication No. 2013-212839 (JP 2013-212839 A), Japanese Patent No. 4292562, and Japanese Patent Application Publication No. 11-34774 (JP 11-34774 A), there have been developed vehicle alarm devices that acquire road surface information and information on the relative position between the vehicle and a lane on the basis of an image captured by a camera mounted on the vehicle to alarm a driver if the vehicle is about to depart from the lane.

SUMMARY OF THE INVENTION

An object of the present invention is to provide a steering assist device capable of guiding a vehicle so as to avoid departure of the vehicle from a lane.

According to an aspect of the present invention, a steering assist device includes:

an electric motor that supplies applies a steering drive force to a steering mechanism of a vehicle;

an information acquisition unit that acquires a lateral deviation of the vehicle from a target travel line and a lateral deviation variation rate which is a variation rate of the lateral deviation per unit time;

a basic target current value setting unit that sets a basic target current value for the electric motor;

a current compensation value computation unit that computes a current compensation value for compensating the basic target current value on the basis of the lateral deviation and the lateral deviation variation rate acquired by the information acquisition unit such that the lateral deviation and the lateral deviation variation rate get close to zero;

a target current value computation unit that computes a target current value by compensating the basic target current value set by the basic target current value setting unit with the current compensation value computed by the current compensation value computation unit; and a control unit that controls drive of the electric motor on the basis of the target current value computed by the target current value computation unit.

According to the aspect described above, the steering drive force corresponding to the basic target current value can be corrected such that the lateral deviation and the lateral deviation variation rate get close to zero. Consequently, the vehicle is guided such that the lateral deviation gets close to zero, and thus the vehicle can be guided so as to get close to the target travel line. In addition, the vehicle is guided such that the lateral deviation variation rate gets close to zero, and thus the vehicle can be guided such that the center line of the vehicle in the front-rear direction extends in parallel with the target travel line around the target travel line. Consequently, the vehicle can be guided so as to avoid departure of the vehicle from the lane.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described in detail below with reference to the accompanying drawings.

Figure 1:
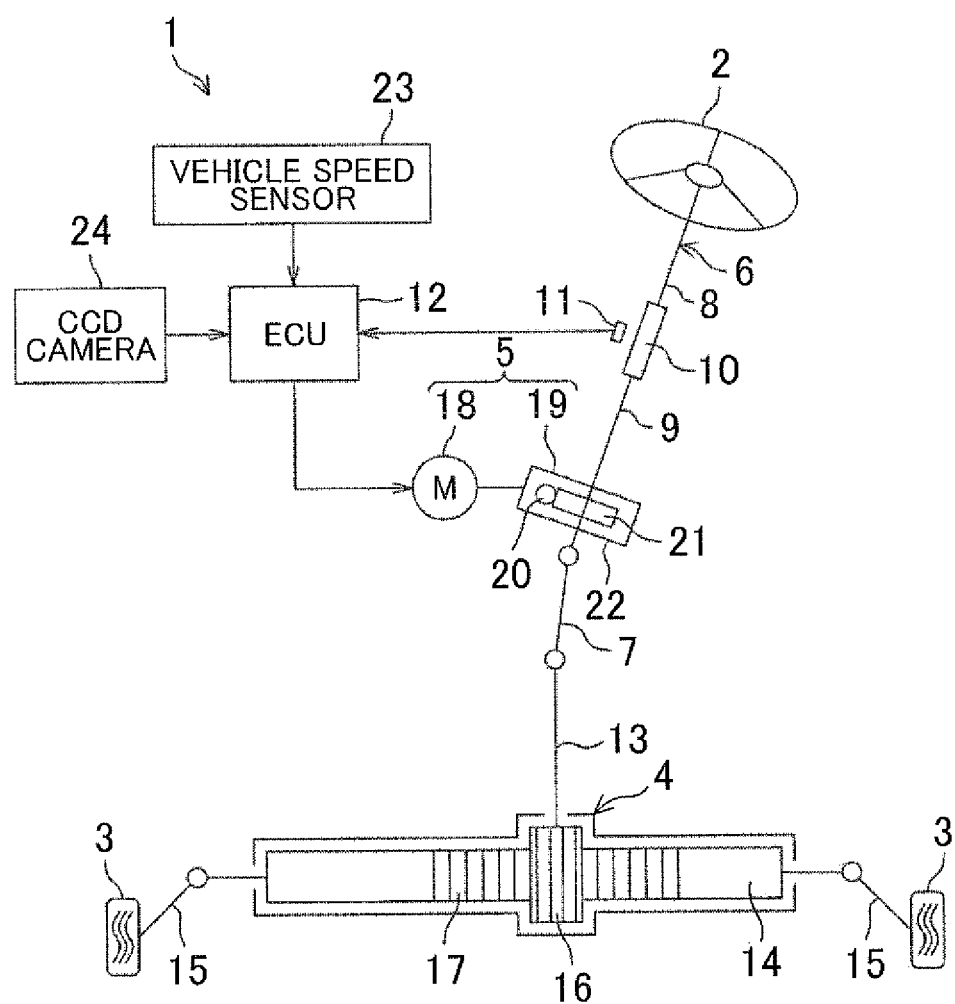
FIG. 1 is a schematic diagram illustrating a schematic configuration of an electric power steering device to which a steering assist device according to an embodiment of the present invention is applied.

FIG. 1 is a schematic diagram illustrating a schematic configuration of an electric power steering device to which a steering assist device according to an embodiment of the present invention is applied.

An electric power steering (EPS) device 1 includes a steering wheel 2 that serves as a steering member used to steer a vehicle, a steering shaft 6, an intermediate shaft 7, a steering mechanism 4 that steers steered wheels 3, and a steering assist mechanism 5 that assists a driver in steering. The steering wheel 2 and the steering mechanism 4 are mechanically coupled to each other via the steering shaft 6 and the intermediate shaft 7.

The steering shaft 6 includes an input shaft 8 coupled to the steering wheel 2, and an output shaft 9 coupled to the intermediate shaft 7. The input shaft 8 and the output shaft 9 are coupled to each other so as to be relatively rotatable via a torsion bar 10.

A torque sensor 11 is disposed around the torsion bar 10. The torque sensor 11 detects steering torque T applied to the steering wheel 2 on the basis of the amount of relative rotational displacement of the output shaft 9 with respect to the input shaft 8. In the embodiment, the steering torque T detected by the torque sensor 11 is detected as a positive value when the vehicle is steered to the right, and as a negative value when the vehicle is steered to the left, for example, and the magnitude of the steering torque is larger as the absolute value of the positive or negative value is larger.

The steering mechanism 4 is composed of a rack-and-pinion mechanism including a pinion shaft 13 and a rack shaft 14 that serves as a steered shaft. The steered wheels 3 are coupled to end portions of the rack shaft 14 via tie rods 15 and knuckle arms (not illustrated). The pinion shaft 13 is coupled to the intermediate shaft 7. The pinion shaft 13 is rotated in conjunction with a steering operation of the steering wheel 2. A pinion 16 is coupled to the distal end (the lower end in FIG. 1) of the pinion shaft 13.

The rack shaft 14 extends linearly along the right-left direction of the vehicle. A rack 17 meshed with the pinion 16 is formed at an axially intermediate portion of the rack shaft 14. The pinion 16 and the rack 17 convert rotational motion of the pinion shaft 13 into linear motion of the rack shaft 14 in the axial direction. The steered wheels 3 can be steered by linearly moving the rack shaft 14 in the axial direction.

When the steering wheel 2 is steered (rotated), rotational motion of the steering wheel 2 is transferred to the steering mechanism 4 via the steering shaft 6 and the intermediate shaft 7. Linear motion of the steering mechanism 4 is then transferred to the steered wheels 3 via the tie rods 15 and the knuckle arms to steer the steered wheels 3.

The steering assist mechanism 5 is attached around the steering shaft 6. The steering assist mechanism 5 includes an electric motor 18 that assists steering by generating a steering assist force, and a speed reduction mechanism 19 that transfers output torque of the electric motor 18 to the steering mechanism 4. The speed reduction mechanism 19 is composed of a worm gear mechanism including a worm shaft 20 and a worm wheel 21 meshed with the worm shaft 20. The speed reduction mechanism 19 is housed in a gear housing 22.

The worm shaft 20 is rotationally driven by the electric motor 18. The worm wheel 21 is coupled so as to be rotatable in the same direction as the steering shaft 6. The worm wheel 21 is rotationally driven by the worm shaft 20.

When the worm shaft 20 is rotationally driven by the electric motor 18, the worm wheel 21 is rotationally driven to generate a steering assist force. The steering assist force is transferred to the steering shaft 6, and added to the steering torque applied to the steering wheel 2 by the driver to rotationally drive the steering shaft 6. Rotation of the steering shaft 6 is then transferred to the pinion shaft 13 via the intermediate shaft 7. Rotation of the pinion shaft 13 is converted into linear motion of the rack shaft 14. Consequently, the steered wheels 3 are steered. That is, the worm shaft 20 is rotationally driven by the electric motor 18 to assist steering of the steered wheels 3. In short, the electric motor 18 generates a steering drive force for steering the steered wheels 3.

The vehicle is provided with a vehicle speed sensor 23 that detects a vehicle speed V, and a charge coupled device (CCD) camera 24 that captures an image of a road ahead of the vehicle in the travelling direction.

The steering torque T detected by the torque sensor 11, the vehicle speed V detected by the vehicle speed sensor 23, and an image signal output from the CCD camera 24 are input to an electronic control unit (ECU) 12. The ECU 12 controls the electric motor 18 on the basis of such input signals.

Figure 2:
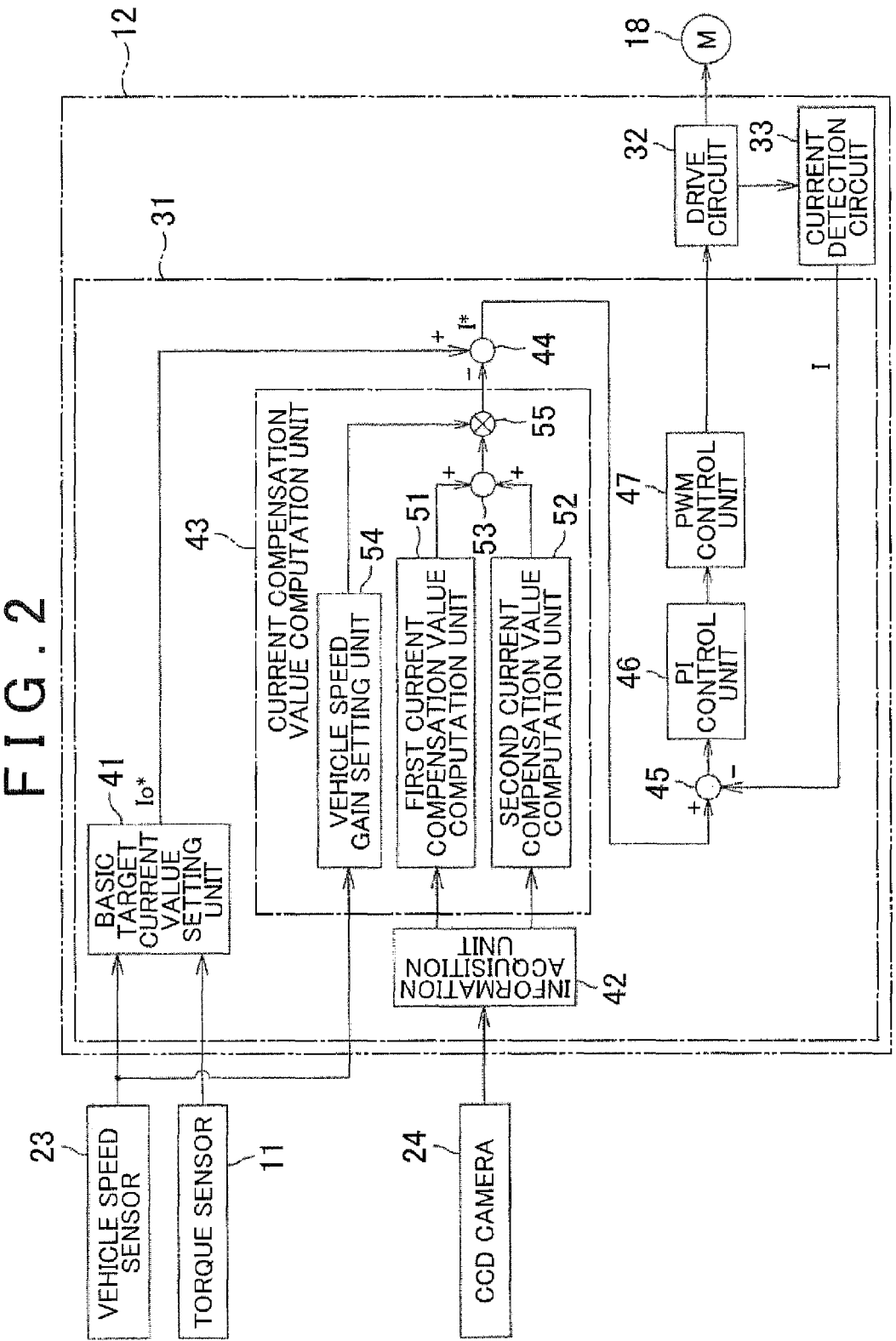
FIG. 2 is a block diagram illustrating the electric configuration of an ECU.

FIG. 2 is a block diagram illustrating the electric configuration of the ECU 12. The ECU 12 includes a microcomputer 31 that controls the electric motor 18, a drive circuit (inverter circuit) that is controlled by the microcomputer 31 and supplies electric power to the electric motor 18, and a current detection circuit 33 that detects a motor current (actual current value) that flows through the electric motor 18.

The microcomputer 31 includes a CPU and a memory, and executes a predetermined program to function as a plurality of function processing units. The memory is composed of a ROM, a RAM, a non-volatile memory, etc. The function processing units include a basic target current value setting unit 41, an information acquisition unit 42, a current compensation amount computation unit 43, a target current value computation unit 44, a current deviation computation unit 45, a PI control unit 46, and a PWM control unit 47.

Figure 3:
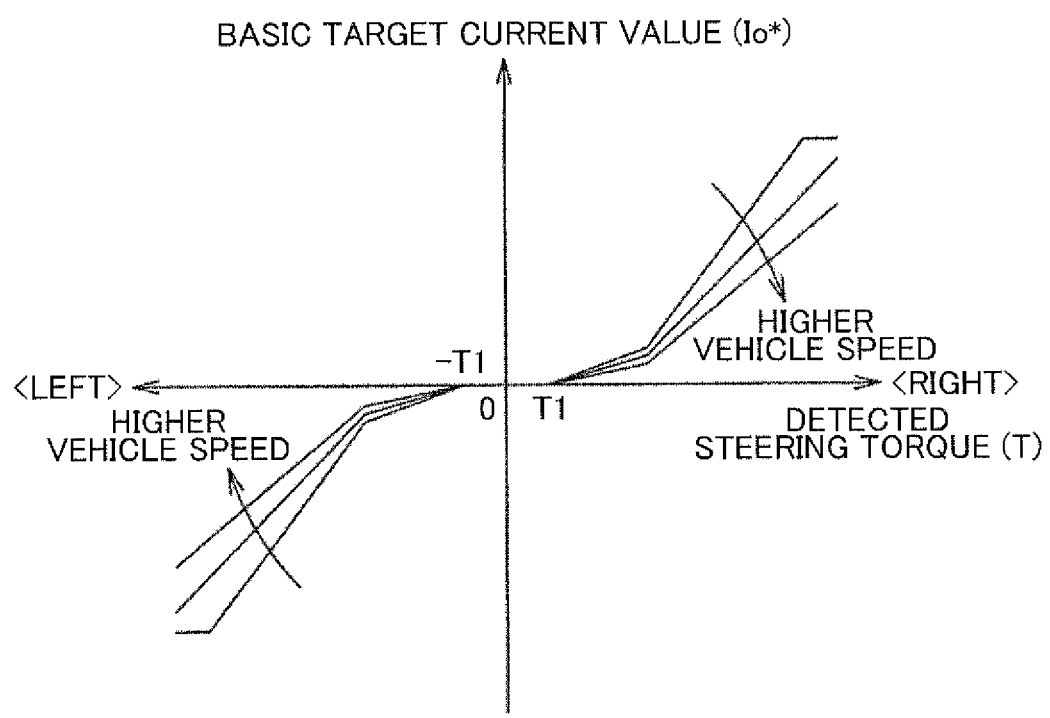
FIG. 3 is a graph illustrating an example of a basic target current value Io* set with respect to detected steering torque T.

The basic target current value setting unit 41 sets a basic target current value Io* on the basis of the steering torque T detected by the torque sensor 11 and the vehicle speed V detected by the vehicle speed sensor 23. An example of the basic target current value Io* set with respect to the detected steering torque T is illustrated in FIG. 3. The detected steering torque T has a positive value if the torque is applied to steer the vehicle to the right (clockwise), and a negative value if the torque is applied to steer the vehicle to the left (counterclockwise), for example. In addition, the basic target current value Io* has a positive value when the electric motor 18 should generate a steering assist force for steering the vehicle to the right, and a negative value when the electric motor 18 should generate a steering assist force for steering the vehicle to the left.

The basic target current value Io* is positive when the detected steering torque T has a positive value, and is negative when the detected steering torque T has a negative value. When the detected steering torque T has a very small value in the range of $-T1$ to $T1$ ($T1=0.4$ N·m, for example), the basic target current value Io* is set to zero. The range of $-T1$ to $T1$ is called a torque dead band. In the case where the detected steering torque T has a value outside the range of $-T1$ to $T1$, the basic target current value Io* is set such that the absolute value thereof becomes larger as the absolute value of the detected steering torque T becomes larger. In addition, the basic target current value Io* is set such that the absolute value thereof becomes smaller as the vehicle speed V detected by the vehicle speed sensor 23 becomes higher. Consequently, a large steering assist force can be generated during low-speed travel, and a small steering assist force can be generated during high-speed travel.

Figure 4:
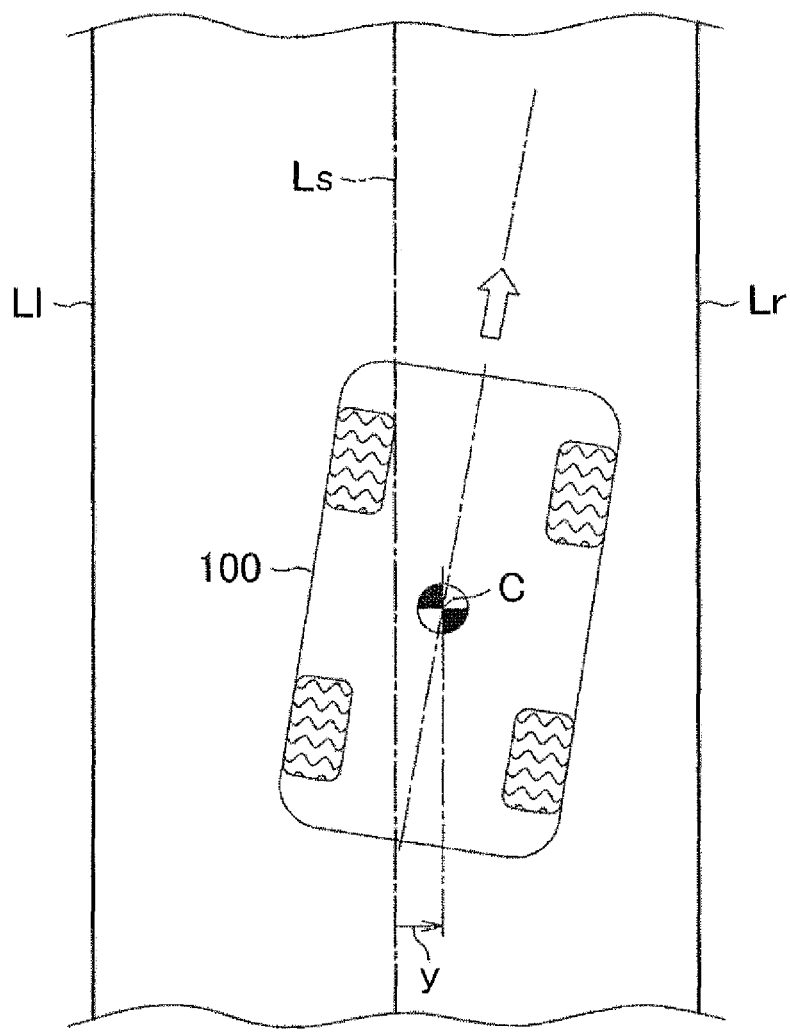
FIG. 4 is a schematic diagram for explaining operation of an information acquisition unit.

The information acquisition unit 42 recognizes the travel lane of a vehicle 100 by recognizing a pair of lane marking lines Lr and Ll indicating the right and left boundaries of the lane in which the vehicle 100 is traveling on the basis of the image captured by the CCD camera 24 as illustrated in FIG. 4. The lane marking lines may be white lines, for example. The information acquisition unit 42 sets a target travel line Ls for the vehicle 100 in the travel lane of the vehicle 100. In the embodiment, the target travel line Ls is set at the center of the travel lane in the width direction. In addition, the information acquisition unit 42 acquires a lateral deviation y of the vehicle 100 from the target travel line Ls and a lateral deviation variation rate dy/dt which is a variation rate of the lateral deviation y per unit time.

The lateral deviation y of the vehicle 100 represents the distance from a reference position C of the vehicle 100 to the target travel line Ls in the plan view illustrated in FIG. 4. The reference position C of the vehicle 100 may be the position of the center of gravity of the vehicle 100, or may be the position at which the CCD camera 24 is disposed in the vehicle 100. In the embodiment, the lateral deviation y is set such that, with the vehicle 100 facing in the travelling direction, the sign of the lateral deviation y is positive in the case where the reference position C of the vehicle 100 is on the right side of the target travel line Ls, and the sign of the lateral deviation y is negative in the case where the reference position C of the vehicle 100 is on the left side of the target travel line Ls.

The lateral deviation variation rate dy/dt may be a deviation $(y(t)-y(t-\Delta t))$ between the lateral deviation $y(t)$ acquired currently and the lateral deviation $y(t-\Delta t)$ acquired a predetermined unit time $\Delta t$ earlier. Alternatively, the lateral deviation variation rate dy/dt may be a deviation $(y(t+\Delta t)-y(t))$ between the lateral deviation $y(t+\Delta t)$ expected to be acquired a predetermined unit time $\Delta t$ later and the lateral deviation $y(t)$ acquired currently. The expected value $y(t+\Delta t)$ of the lateral deviation may be obtained in consideration of the vehicle speed, the yaw angle, etc.

Still alternatively, the lateral deviation variation rate dy/dt may be a deviation $(y(t+\Delta tx+\Delta t)-y(t+\Delta tx))$ between the lateral deviation $y(t+\Delta tx)$ expected to be acquired at a time point t1 a predetermined time $\Delta tx$ later from current time and the lateral deviation $y(t+\Delta tx+\Delta t)$ expected to be acquired at a time point t2 a predetermined unit time $\Delta t$ later from the time point t1. The expected values $y(t+\Delta tx)$ and $y(t+\Delta tx+\Delta t)$ of the lateral deviation may be obtained in consideration of the vehicle speed, the yaw angle, etc. A method of capturing a road ahead of a vehicle in the travelling direction and computing or expecting a lateral deviation y of the vehicle is known publicly as described in JP 2013-212839 A, Japanese Patent No. 4292562, and JP 11-34774 A, and thus is not described herein.

The current compensation value computation unit 43 computes a current compensation value Ir for compensating the basic target current value Io* on the basis of the lateral deviation y and the lateral deviation variation rate dy/dt such that the lateral deviation y and the lateral deviation variation rate dy/dt get close to zero. Operation of the current compensation value computation unit 43 will be described in detail later.

The target current value computation unit 44 computes a target current value I* by compensating the basic target current value Io* set by the basic target current value setting unit 41 using the current compensation value Ir computed by the current compensation value computation unit 43. Specifically, the target current value computation unit 44 computes the target current value I* by subtracting the current compensation value Ir from the basic target current value Io*. The current deviation computation unit 45 computes a deviation (current deviation $\Delta I=I^*-I$) between the target current value I* obtained by the target current value computation unit 44 and the motor current I detected by the current detection circuit 33.

The PI control unit 46 performs PI computation on the current deviation $\Delta T$ computed by the current deviation computation unit 45 to generate a drive command value for bringing the motor current I flowing through the electric motor 18 closer to the target current value I*. The PWM control unit 47 generates a PWM control signal with a duty ratio corresponding to the drive command value to supply the generated PWM control signal to the drive circuit 32. Consequently, electric power corresponding to the drive command value is supplied to the electric motor 18. The current deviation computation unit 45 and the PI control unit 46 constitute a current feedback control unit. The current feedback control unit operates to control the motor current I flowing through the electric motor 18 so as to get close to the target current value I*.

Next, operation of the current compensation value computation unit 43 will be described in detail. As illustrated in FIG. 2, the current compensation value computation unit 43 includes a first current compensation value computation unit 51, a second current compensation value computation unit 52, an addition unit 53, a vehicle speed gain setting unit 54, and a multiplication unit 55.

The first current compensation value computation unit 51 computes a first current compensation value Ir1 on the basis of the lateral deviation y. The second current compensation value computation unit 52 computes a second current compensation value Ir2 on the basis of the lateral deviation variation rate dy/dt. The addition unit 53 computes a total current compensation value (Ir1+Ir2) by adding the first current compensation value Ir1 computed by the first current compensation value computation unit 51 and the second current compensation value Ir2 computed by the second current compensation value computation unit 52. The addition unit 53 is included in a third computation unit according to the present invention. The vehicle speed gain setting unit 54 sets a vehicle speed gain G corresponding to the vehicle speed V. The multiplication unit 55 computes a current compensation value Ir ($=G\cdot(Ir1+Ir2)$) by multiplying the total current compensation value (Ir1+Ir2) computed by the addition unit 53 by the vehicle speed gain G set by the vehicle speed gain setting unit 54. The vehicle speed gain setting unit 54 and the multiplication unit 55 are included in a fourth computation unit according to the present invention.

Next, each of the first current compensation value computation unit 51, the second current compensation value computation unit 52, and the vehicle speed gain setting unit 54 will be described more specifically. The first current compensation value computation unit 51 computes the first current compensation value Ir1 on the basis of a map or a computation formula that indicates the relationship of the first current compensation value Ir1 with respect to the lateral deviation y set in advance. The second current compensation value computation unit 52 computes the second current compensation value Ir2 on the basis of a map or a computation formula that indicates the relationship of the second current compensation value Ir2 with respect to the lateral deviation variation rate dy/dt set in advance.

Defining a1 and a2 as constants with the same sign, defining b1 as an exponent that is a natural number of two or more, and defining b2 as an exponent that is a natural number and less than b1, the first current compensation value computation unit 51 and the second current compensation value computation unit 52 preferably compute the first current compensation value Ir1 and the second current compensation value Ir2, respectively, as follows. That is, in the case where b1 is set to an odd number, the first current compensation value computation unit 51 preferably computes the first current compensation value Ir1 on the basis of the relationship between y and Ir1 represented by a function $Ir1=a1\cdot y^{b1}$. In the case where b1 is set to an even number, meanwhile, the first current compensation value computation unit 51 preferably computes the first current compensation value Ir1 on the basis of the relationship between y and Ir1 represented by a function $Ir1=a1\cdot y^{b1}$ in the range of $y\geq 0$ and by a function $Ir1=-a1\cdot y^{b1}$ in the range of $y<0$.

In the case where b2 is set to an odd number, the second current compensation value computation unit 52 preferably computes the second current compensation value Ir2 on the basis of the relationship between dy/dt and Ir2 represented by a function $Ir2=a2\cdot(dy/dt)^{b2}$. In the case where b2 is set to an even number, meanwhile, the second current compensation value computation unit 52 preferably computes the second current compensation value Ir2 on the basis of the relationship between dy/dt and Ir2 represented by a function $Ir2=a2\cdot(dy/dt)^{b2}$ in the range of $dy/dt\geq 0$ and by a function $Ir2=-a2\cdot(dy/dt)^{b2}$ in the range of $dy/dt<0$.

In the embodiment, as discussed earlier, the basic target current value Io* is set to a positive value when the electric motor 18 should generate a steering assist force for steering the vehicle to the right, and set to a negative value when the electric motor 18 should generate a steering assist force for steering the vehicle to the left. The lateral deviation y is set such that, with the vehicle facing in the travelling direction, the sign of the lateral deviation y is positive in the case where the reference position of the vehicle is on the right side of the target travel line Ls, and the sign of the lateral deviation y is negative in the case where the reference position of the vehicle is on the left side of the target travel line Ls. In such a case, the constants a1 and a2 are set to positive values.

In the case where the sign of the basic target current value Io* is set to be opposite to that in the embodiment described above and the sign of the lateral deviation y is set to be opposite to that in the embodiment described above, the constants a1 and a2 are also set to positive values. On the other hand, in the case where the sign of the basic target current value Io* is set to the same as that in the embodiment described above and the sign of the lateral deviation y is set to be opposite to that in the embodiment described above, or in the case where the sign of the basic target current value Io* is set to be opposite to that in the embodiment described above and the sign of the lateral deviation y is set to the same as that in the embodiment described above, the constants a1 and a2 are set to negative values.

The reason that the first current compensation value computation unit 51 and the second current compensation value computation unit 52 preferably compute the first current compensation value Ir1 and the second current compensation value Ir2, respectively, using the functions discussed above will be described. In general, for a function represented by $f(x)=ax^b$ ("a" is a constant, b is an exponent that is a natural number) the absolute value of f(x) becomes larger as the absolute value of x becomes larger. In the case where the value of b is two or more, in addition, the average variation rate of f(x) becomes higher as the absolute value of x becomes larger. The term "average variation rate" refers to (variation amount of f(x))/(variation amount of x).

If the value of b1 is two or more, the absolute value of the first current compensation value Ir1 becomes larger as the absolute value of the lateral deviation y becomes larger, and the average variation rate of the first current compensation value Ir1 (the increase rate of the absolute value of Ir1) becomes higher as the absolute value of the lateral deviation y becomes larger. Therefore, the vehicle can be immediately guided toward the target travel line (in the embodiment, toward the center of the travel lane in the width direction).

With the function represented by $f(x)=ax^b$, as b comes larger, the average variation rate of f(x) becomes lower in the range in which the absolute value of x is less than one, and the average variation rate of f(x) becomes higher in the range in which the absolute value of x is one or more. In the embodiment, in the case where a1 is equal to a2, and if b1 is larger than b2, the average variation rate of the first current compensation value Ir1 in the range in which the absolute value of the lateral deviation y is less than one is lower than the average variation rate of the second current compensation value Ir2 in the range in which the absolute value of the lateral deviation variation rate dy/dt is less than one, and the average variation rate of the first current compensation value Ir1 in the range in which the absolute value of the lateral deviation y is more than one is higher than the average variation rate of the second current compensation value Ir2 in the range in which the absolute value of the lateral deviation variation rate dy/dt is more than one.

Thus, in the case where the reference position of the vehicle is in a region away from the target travel line, operation of the first current compensation value Ir1 to bring the lateral deviation y closer to zero is stronger than operation of the second current compensation value Ir2 to bring the lateral deviation variation rate dy/dt closer to zero even if the sign of the second current compensation value Ir2 becomes opposite to the sign of the first current compensation value Ir1. Therefore, the vehicle can be guided toward the target travel line (in the embodiment, toward the center of the travel lane in the width direction).

Figure 5A:
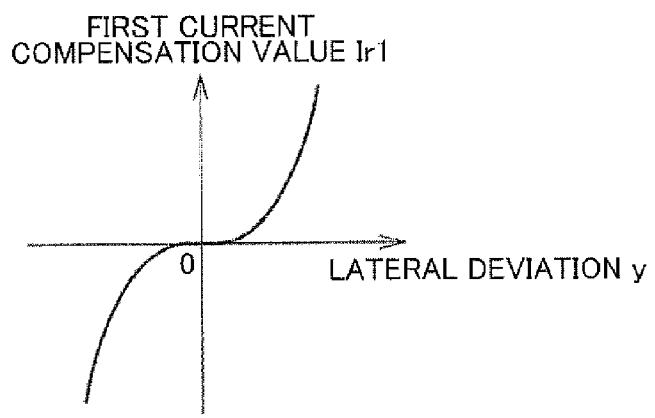
FIG. 5A is a graph illustrating an example of the relationship of a first current compensation value Ir1 with respect to a lateral deviation y.

In addition, the second current compensation value Ir2 corresponding to the magnitude of the lateral deviation variation rate dy/dt can be obtained irrespective of the value of the lateral deviation y. Therefore, the vehicle can be guided such that the lateral deviation variation rate dy/dt gets closer to zero, that is, the center line of the vehicle in the front-rear direction extends in parallel with the target travel line even in the case where the reference position of the vehicle is in a region around the target travel line. In the embodiment, the first current compensation value computation unit 51 computes the first current compensation value Ir1 on the basis of a map that stores the relationship of the first current compensation value Ir1 with respect to the lateral deviation y illustrated in FIG. 5A or a computation formula that represents the relationship. In the example of FIG. 5A, the first current compensation value Ir1 is represented by a cubic function $Ir1=a1 \cdot y^3$ with a1 being a positive constant. In short, the function corresponds to a case where a1 is positive and b1 is three.

Figure 5B:
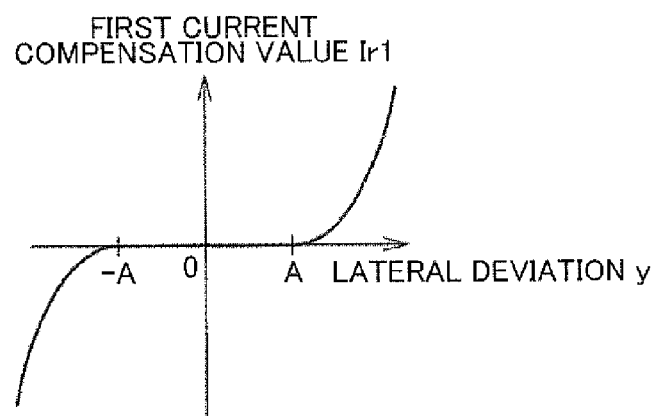
FIG. 5B is a graph illustrating another example of the relationship of the first current compensation value Ir1 with respect to the lateral deviation y.

The first current compensation value computation unit 51 may compute the first current compensation value Ir1 on the basis of a map that stores the relationship of the first current compensation value Ir1 with respect to the lateral deviation y illustrated in FIG. 5B or a computation formula that represents the relationship, for example. The curve in the graph illustrated in FIG. 5B is prepared by moving by −A (A>0) in the horizontal axis direction the curve of FIG. 5A in a region in which Ir1 is less than zero and moving by +A (A>0) in the horizontal axis direction the curve of FIG. 5A in a region in which Ir1 is more than zero. For the curve of FIG. 5B, a dead band in which the first current compensation value Ir1 is zero is set in the range in which the lateral deviation y is −A (A>0) to A.

Figure 5C:
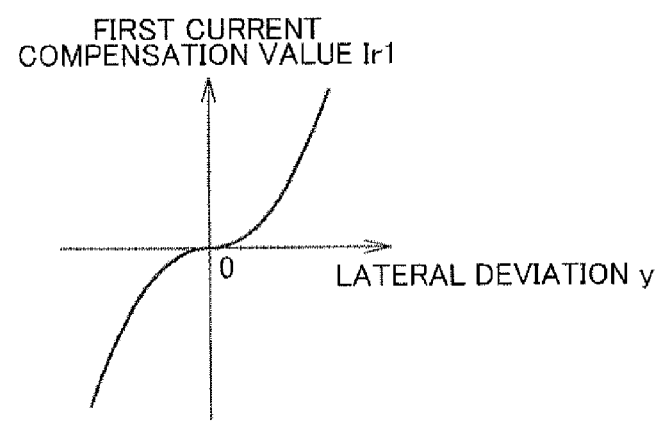
FIG. 5C is a graph illustrating still another example of the relationship of the first current compensation value Ir1 with respect to the lateral deviation y.

The first current compensation value computation unit 51 may compute the first current compensation value Ir1 on the basis of a map that stores the relationship of the first current compensation value Ir1 with respect to the lateral deviation y illustrated in FIG. 5C or a computation formula that represents the relationship, for example. In the example of FIG. 5C, the first current compensation value Ir1 is represented by a quadratic function $Ir1=a1 \cdot y^2$ in the range of y≥0 and represented by a quadratic function $Ir1=-a1 \cdot y^2$ in the range of y<0 with a1 being a positive constant. The function corresponds to a case where a1 is positive and b1 is two.

Figure 6A:
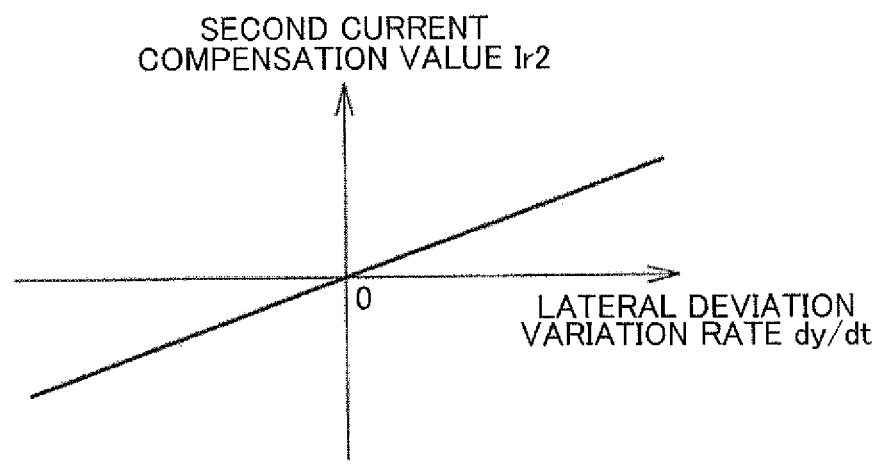
FIG. 6A is a graph illustrating an example of the relationship of a second current compensation value Ir2 with respect to a lateral deviation variation rate dy/dt.

In the embodiment, the second current compensation value computation unit 52 computes the second current compensation value Ir2 on the basis of a map that stores the relationship of the second current compensation value Ir2 with respect to the lateral deviation variation rate dy/dt illustrated in FIG. 6A or a computation formula that represents the relationship. In the example of FIG. 6A, the second current compensation value Ir2 is represented by a linear function $Ir2=a2 \cdot dy/dt$ with a2 being a positive constant. In short, the function corresponds to a case where a2 is positive and b2 is one. A dead band in which the second current compensation value Ir2 is zero may be provided in a region in which the absolute value of the lateral deviation variation rate dy/dt is around zero.

Figure 6B:
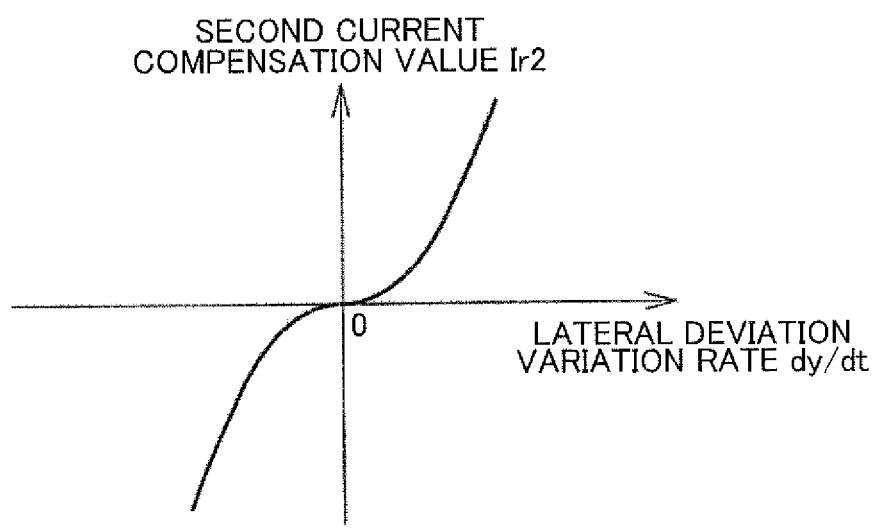
FIG. 6B is a graph illustrating another example of the relationship of the second current compensation value Ir2 with respect to the lateral deviation variation rate dy/dt.

The second current compensation value computation unit 52 may compute the second current compensation value Ir2 on the basis of a map that stores the relationship of the second current compensation value Ir2 with respect to the lateral deviation variation rate dy/dt illustrated in FIG. 6B or a computation formula that represents the relationship. In the example of FIG. 6B, the second current compensation value Ir2 is represented by a quadratic function $Ir2=a2 \cdot (dy/dt)^2$ in the range of $dy/dt \geq 0$ and represented by a quadratic function $Ir2=-a2 \cdot (dy/dt)^2$ in the range of $dy/dt<0$ with a2 being a positive constant. The function corresponds to a ease where a2 is positive and b2 is two.

Figure 7:
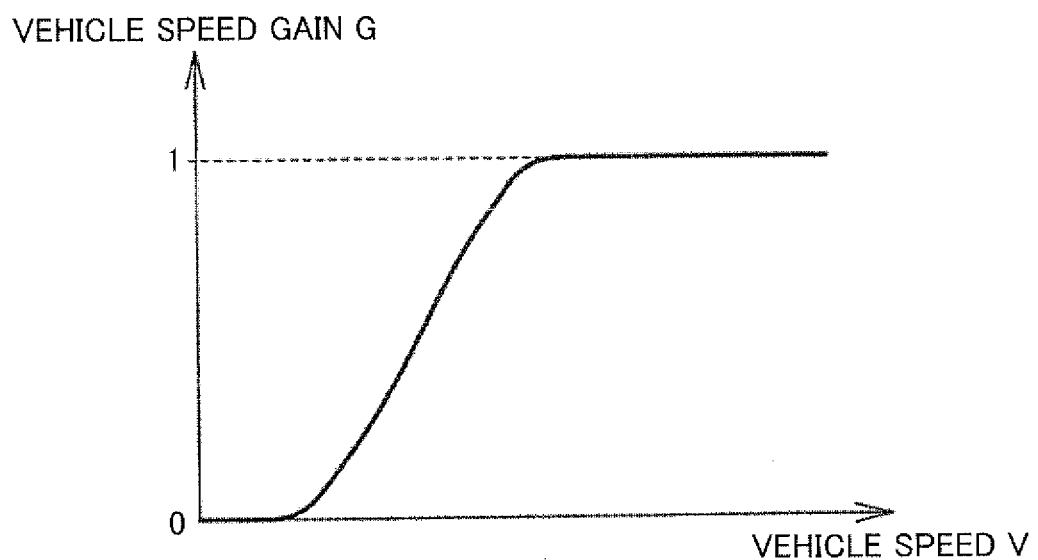
FIG. 7 is a graph illustrating an example of vehicle speed gain G set with respect to a vehicle speed V.

The vehicle speed gain setting unit 54 sets the vehicle speed gain G on the basis of the vehicle speed V detected by the vehicle speed sensor 23. An example of the vehicle speed gain G set with respect to the vehicle speed V is illustrated in FIG. 7. In the example of FIG. 7, the vehicle speed gain G is fixed at zero when the vehicle speed V is in the range around zero, and fixed at one when the vehicle speed V is more than a predetermined value. The vehicle speed gain G is set so as to increase from zero to one according to the vehicle speed V when the vehicle speed V has a value in an intermediate range.

In the embodiment, the current compensation value computation unit 43 computes the current compensation value Ir for compensating the basic target current value Io* such that the lateral deviation y and the lateral deviation variation rate dy/dt get close to zero. The target current value computation unit 44 computes the target current value I* by subtracting the current compensation value Ir from the basic target current value Io*. Then, the motor current I flowing through the electric motor 18 is then controlled so as to get close to the target current value I*.

Thus, the current compensation value computation unit 43 and the target current value computation unit 44 can correct the steering drive force corresponding to the basic target current value Io* (the steering assist force corresponding to the steering torque T and the vehicle speed V) such that the lateral deviation y and the lateral deviation variation rate dy/dt get close to zero. Consequently, the vehicle is guided such that the lateral deviation y gets close to zero, and thus the vehicle can be guided so as to approach the target travel line (in the embodiment, the center of the travel lane in the width direction). In addition, the second current compensation value Ir2 corresponding to the magnitude of the lateral deviation variation rate dy/dt can be obtained irrespective of the value of the lateral deviation y. Therefore, the vehicle can be guided such that the center line of the vehicle in the front-rear direction extends in parallel with the target travel line even in the case where the reference position of the vehicle is in a region around the target travel line. Consequently, the vehicle can be guided so as to avoid departure of the vehicle from the lane.

In the embodiment, in addition, the relationship of the first current compensation value Ir1 with respect to the lateral deviation y is represented by the function $Ir1=a1 \cdot y^3$. Meanwhile, the relationship of the second current compensation value Ir2 with respect to the lateral deviation variation rate dy/dt is represented by the function Ir1 $a2 \cdot (dy/dt)$. In short, the value of b1 is two or more, and b1 is larger than b2. Thus, in the case where the reference position of the vehicle is in a region away from the target travel line, operation of the first current compensation value Ir1 to bring the lateral deviation y closer to zero is stronger than operation of the second current compensation value Ir2 to bring the lateral deviation variation rate dy/dt closer to zero even if the sign of the second current compensation value Ir2 is opposite to the sign of the first current compensation value Ir1. Therefore, the vehicle can be guided toward the target travel line (in the embodiment, toward the center of the travel lane in the width direction).

In the embodiment, in addition, the current compensation value Ir is computed by multiplying the total current compensation value (Ir1+Ir2) by the vehicle speed gain G corresponding to the vehicle speed V. Consequently, the current compensation value Ir that is appropriate for the vehicle speed V can be set. For example, the current compensation value Ir can be increased at a high vehicle speed, at which a quick response is desired, compared to a low vehicle speed. In addition, the vehicle speed gain G is fixed at zero when the vehicle speed V is in the range around zero. Thus, the steered wheels 3 can be prevented from being steered on the basis of the first current compensation value Ir1 and the second current compensation value Ir2 when the vehicle is substantially stationary. In the embodiment, in addition, the first current compensation value Ir1 is defined by a function of the lateral deviation y. Thus, the relationship between the lateral deviation y and the first current compensation value Ir1 can be set easily. Likewise, the second current compensation value Ir2 is defined by a function of the lateral deviation variation rate dy/dt. Thus, the relationship between the lateral deviation variation rate dy/dt and the second current compensation value Ir2 can be set easily.

Although an embodiment of the present invention has been described above, the present invention may be implemented in different embodiments. For example, a limiter that limits the absolute value of the total current compensation value (Ir1+Ir2) to a predetermined range may be provided between the addition unit 53 and the multiplication unit 55.

In the embodiment discussed above, the multiplication unit 55 (see FIG. 2) is provided. In different embodiments, however, the multiplication unit 55 may be omitted. In the embodiment discussed above, the basic target current value setting unit 41 sets the basic target current value Io* using the steering torque T (specifically, on the basis of the steering torque T and the vehicle speed V). In different embodiments, however, the basic target current value Io* may be set using a steering angle.

In the embodiment discussed above, the present invention is applied to an electric power steering device. However, the present invention may also be applied to a steer-by-wire (SBW) system and other vehicle steering devices. In addition, the present invention may also be applied to an automatic operation mode in which the steering wheel 2 is not operated.

What is claimed is:

1. A steering assist device comprising:
   an electric motor that supplies applies a steering drive force to a steering mechanism of a vehicle;
   an information acquisition unit that acquires a lateral deviation of the vehicle from a target travel line and a lateral deviation variation rate which is a variation rate of the lateral deviation per unit time;
   a basic target current value setting unit that sets a basic target current value for the electric motor;
   a current compensation value computation unit that computes a current compensation value for compensating the basic target current value on the basis of the lateral deviation and the lateral deviation variation rate acquired by the information acquisition unit such that the lateral deviation and the lateral deviation variation rate get close to zero;
   a target current value computation unit that computes a target current value by compensating the basic target current value set by the basic target current value setting unit with the current compensation value computed by the current compensation value computation unit; and a control unit that controls drive of the electric motor on the basis of the target current value computed by the target current value computation unit.

2. The steering assist device according to claim 1, wherein the current compensation value computation unit includes:
- a first computation unit that computes a first current compensation value on the basis of the lateral deviation acquired by the information acquisition unit;
- a second computation unit that computes a second current compensation value on the basis of the lateral deviation variation rate acquired by the information acquisition unit; and
- a third computation unit that computes the current compensation value by adding the first current compensation value computed by the first computation unit and the second current compensation value computed by the second computation unit.

3. The steering assist device according to claim 1, further comprising:
- a vehicle speed detector that detects a vehicle speed, wherein
the current compensation value computation unit includes:
- a first computation unit that computes a first current compensation value on the basis of the lateral deviation acquired by the information acquisition unit;
- a second computation unit that computes a second current compensation value on the basis of the lateral deviation variation rate acquired by the information acquisition unit;
- a third computation unit that computes a third current compensation value by adding the first current compensation value computed by the first computation unit and the second current compensation value computed by the second computation unit; and
- a fourth computation unit that computes the current compensation value by setting a vehicle speed gain corresponding to the vehicle speed detected by the vehicle speed detector and multiplying by the vehicle speed gain the third current compensation value computed by the third computation unit.

4. The steering assist device according to claim 2, wherein:
when the lateral deviation acquired by the information acquisition unit is defined as y, the lateral deviation variation rate acquired by the information acquisition unit is defined as dy/dt, the first current compensation value is defined as Ir1, the second current compensation value is defined as Ir2,
in the first computation unit and the second computation unit, a1 and a2 are set to constants with the same sign, b1 is set to an exponent that is a natural number of two or more, and b2 is set to an exponent that is a natural number and less than b1,
the first computation unit is configured to compute the first current compensation value Ir1, in the case where b1 is set to an odd number, on the basis of a relationship between y and Ir1 represented by a function $Ir1=a1 \cdot y^{b1}$, and to compute the first current compensation value Ir1, in the case where b1 is set to an even number, on the basis of a relationship between y and Ir1 represented by a function $Ir1=a1 \cdot y^{b1}$ in a range of y≥0 and represented by a function $Ir1=-a1 \cdot y^{b1}$ in a range of y<0; and
the second computation unit is configured to compute the second current compensation value Ir2, in the case where b2 is set to an odd number, on the basis of a relationship between dy/dt and Ir2 represented by a function $Ir2=a2 \cdot (dy/dt)^{b2}$, and compute the second current compensation value Ir2, in the case where b2 is set to an even number, on the basis of a relationship between dy/dt and Ir2 represented by a function $Ir2=a2 \cdot (dy/dt)^{b2}$ in a range of dy/dt≥0 and represented by a function $Ir2=-a2 \cdot (dy/dt)^{b2}$ in a range of dy/dt<0.

5. The steering assist device according to claim 3, wherein:
when the lateral deviation acquired by the information acquisition unit is defined as y, the lateral deviation variation rate acquired by the information acquisition unit is defined as dy/dt, the first current compensation value is defined as Ir1, the second current compensation value is defined as Ir2,
in the first computation unit and the second computation unit, a1 and a2 are set to constants with the same sign, b1 is set to an exponent that is a natural number of two or more, and b2 is set to an exponent that is a natural number and less than b1,
the first computation unit is configured to compute the first current compensation value Ir1, in the case where b1 is set to an odd number, on the basis of a relationship between y and Ir1 represented by a function $Ir1=a1 \cdot y^{b1}$, and to compute the first current compensation value Ir1, in the case where b1 is set to an even number, on the basis of a relationship between y and Ir1 represented by a function $Ir1=a1 \cdot y^{b1}$ in a range of y≥0 and represented by a function $Ir1=-a1 \cdot y^{b1}$ in a range of y<0; and
the second computation unit is configured to compute the second current compensation value Ir2, in the case where b2 is set to an odd number, on the basis of a relationship between dy/dt and Ir2 represented by a function $Ir2=a2 \cdot (dy/dt)^{b2}$, and compute the second current compensation value Ir2, in the case where b2 is set to an even number, on the basis of a relationship between dy/dt and Ir2 represented by a function $Ir2=a2 \cdot (dy/dt)^{b2}$ in a range of dy/dt≥0 and represented by a function $Ir2=-a2 \cdot (dy/dt)^{b2}$ in a range of dy/dt<0.

6. The steering assist device according to claim 4, wherein:
the first computation unit is configured to compute the first current compensation value Ir1 on the basis of a relationship between y and Ir1 represented by a function $Ir1=a1 \cdot y^3$; and
the second computation unit is configured to compute the second current compensation value Ir2 on the basis of a relationship between dy/dt and Ir2 represented by a function $Ir2=a2 \cdot (dy/dt)$.

7. The steering assist device according to claim 5, wherein:
the first computation unit is configured to compute the first current compensation value Ir1 on the basis of a relationship between y and Ir1 represented by a function $Ir1=a1 \cdot y^3$; and
the second computation unit is configured to compute the second current compensation value Ir2 on the basis of a relationship between dy/dt and Ir2 represented by a function $Ir2=a2 \cdot (dy/dt)$.

8. The steering assist device according to claim 4, wherein the first computation unit has a dead band in which the first current compensation value Ir1 is zero in a range in which an absolute value of the lateral deviation y is less than a predetermined value.

9. The steering assist device according to claim 4, wherein the second computation unit has a dead band in which the second current compensation value Ir2 is zero in a range in which an absolute value of the lateral deviation variation rate dy/dt is less than a predetermined value.

* * * * *